US007641119B2

(12) United States Patent
Lee

(10) Patent No.: US 7,641,119 B2
(45) Date of Patent: Jan. 5, 2010

(54) BAR CODE LABEL STICKER

(75) Inventor: Kyu Sub Lee, Daegu-si (KR)

(73) Assignee: LG Electronics Inc., Seoul (KR)

( * ) Notice: Subject to any disclaimer, the term of this patent is extended or adjusted under 35 U.S.C. 154(b) by 803 days.

(21) Appl. No.: 11/237,761

(22) Filed: Sep. 29, 2005

(65) Prior Publication Data

US 2006/0081715 A1 Apr. 20, 2006

(30) Foreign Application Priority Data

Oct. 20, 2004 (KR) .................. P10-2004-0084010

(51) Int. Cl.
*G06K 19/00* (2006.01)

(52) U.S. Cl. ...................................... 235/487; 235/494

(58) Field of Classification Search ................. 235/487, 235/462.01, 494

See application file for complete search history.

(56) References Cited

U.S. PATENT DOCUMENTS

| | | | | |
|---|---|---|---|---|
| 6,572,025 | B1 * | 6/2003 | Nishikado et al. | 235/494 |
| 7,051,930 | B2 * | 5/2006 | Vanhall | 235/462.01 |
| 2004/0088228 | A1 * | 5/2004 | Mercer et al. | 705/28 |

FOREIGN PATENT DOCUMENTS

| | | |
|---|---|---|
| KR | 1999-0006678 | 2/1999 |

* cited by examiner

*Primary Examiner*—Daniel St.Cyr
(74) *Attorney, Agent, or Firm*—Birch, Stewart, Kolasch & Birch, LLP

(57) ABSTRACT

Bar code label sticker including a base having a first cutoff line for separating the base into two parts, and a sticker attached on the base, the sticker having a second cutoff line parallel to the first cutoff line at a position spaced a predetermined distance to one side from the first cutoff line, thereby permitting easy management of goods.

13 Claims, 5 Drawing Sheets

BAR CODE LABEL STICKER

CROSS-REFERENCE TO RELATED APPLICATION

This application claims the benefit of Korean Application No. P2004-84010, filed on Oct. 20, 2004, which is hereby incorporated by reference as if fully set forth herein.

BACKGROUND OF THE INVENTION

1. Field of the Invention

The present invention relates to bar code label stickers, and more particularly, to a bar code label sticker with a first sticker and a second sticker of which use and keeping is convenient.

2. Discussion of the Related Art

In general, the bar code label sticker has two stickers separated by a line along which to cut off (a cutoff line) the two stickers, wherein one of the stickers is attached to a package box, and the other is attached to a management pocket notebook or account book, for easy management and classification of the goods later.

Referring to FIG. 1, a related art bar code label sticker will be described, wherein the sticker to be attached to the package box is called as a first sticker, and the sticker to be attached to the pocket notebook or the like for management is called as a second sticker.

Moreover, for the sake of convenience, a bar code label on the first sticker is called as a first bar code label, and a bar code label on the second sticker is called as a second bar code label.

Referring to FIG. 1, a related art bar code label sticker is provided with three layers in total of a base 30, a middle sticker 20 attached to the base 30, and an upper sticker 10 on the middle sticker 20.

There is a cutoff line 18 on the upper sticker 10 crossing the upper sticker 10 in a left/right direction.

Over the cutoff line 18, there is the first sticker 12 having a first bar code label 4 for attachment to the package box, and under the cutoff line 18, there is the second sticker 14 having the second bar code label 5 for attachment to the management notebook, or the like.

The upper sticker 10 and the middle sticker 20 have the same size.

For easy detachment of the middle sticker 20 from the base 30, the base 30 has a length and a width greater than a length and a width of the middle sticker 20.

That is, by providing a predetermined surplus portion at the base 30 on which the middle sticker 20 is not to be attached, detachment of the middle sticker 20 from the base 30 becomes easy.

In the meantime, the first bar code label 4 on the first sticker 12 has information on kind, and number of goods, and the second bar code label 5 has the same information as the first sticker 12.

In the related art bar code label sticker as shown in FIG. 1, back surfaces of the upper sticker 10 and the middle sticker 20 have adhesive applied thereto, and front surfaces of the middle sticker 20 and the base 30 opposite to above back surfaces have vinyl, or the like coated thereon.

A method for using the related art bar code label sticker will be described with reference to FIG. 2.

First, the middle sticker 20 is detached from the base 30, and attached on an outside of the package box.

In this case, the upper sticker 10 is kept attached to the middle sticker 20.

Then, only the second sticker 14 of the upper sticker 10 is detached from the middle sticker 20 for management of goods.

In this instance, the second sticker 14 may be detached together with the middle sticker 20 by a size of the second sticker 14 from the package box.

After attaching the second sticker 14 on the pocket notebook or account book separately for management, the second sticker 14 is compared to the first bar code label 4 on the upper sticker 10 attached on the outside surface of the package box later, for management and control of kinds and number of goods.

However, the related art bar code label sticker described above has the following problems.

First, the three layered sticker with the upper sticker, the middle sticker, and the base has a complicate fabrication process, and a high material cost.

Second, in a case the second sticker is detached, if the second sticker is not attached to the pocket notebook or the account book at once, keeping of the second sticker is substantially troublesome due to the adhesive on the one surface of the second ticker.

Third, if the middle sticker is detached together with the second sticker in order to solve the second problem, due to the adhesive on the middle sticker too, a portion of a surface of the package box is also detached together with the middle sticker if the package box is formed of paper, damaging the package box, the package box can have a poor outer appearance.

SUMMARY OF THE INVENTION

Accordingly, the present invention is directed to a bar code label sticker that substantially obviates one or more problems due to limitations and disadvantages of the related art.

An object of the present invention is to provide a bar code label sticker use of which becomes more convenient.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a bar code label sticker includes a base having a first cutoff line for separating the base into two parts, and a sticker attached on the base, the sticker having a second cutoff line parallel to the first cutoff line at a position spaced a predetermined distance to one side from the first cutoff line.

The base has a length greater than a length of the sticker, and a width greater than a width of the sticker.

The first cutoff line is positioned such that the first cutoff line divides the base into a first base on one side thereof, and a second base on the other side thereof having an area smaller than the first base.

The second cutoff line is positioned such that the second cutoff line divides the base into a first sticker on one side thereof, and a second sticker on the other side thereof having an area smaller than the first sticker.

In the meantime, the first base includes an 1A cutoff line crossing a middle thereof in a length direction so that the first base becomes symmetry in a left/right direction with respect to the 1A cutoff line, and the second base includes an 1B cutoff line crossing a middle thereof in a length direction so that the second base becomes symmetry in a left/right direction with respect to the 1B cutoff line.

Moreover, the first sticker includes a 2A cutoff line crossing a middle thereof in a length direction so that the first sticker becomes symmetry in a left/right direction with respect to the 2A cutoff line, and the second sticker includes a 2B cutoff line crossing a middle thereof in a length direction so that the second sticker becomes symmetry in a left/right direction with respect to the 2B cutoff line.

Each of the first sticker and the second sticker includes a bar code label having information on goods.

The first sticker includes two bar code labels in symmetry in a left/right direction, and the second sticker includes two bar code labels in symmetry in a left/right direction.

In the meantime, in another aspect of the present invention, a bar code label sticker includes a base having a first cutoff line for separating the base into two parts, and a sticker attached on the base, the sticker having a second cutoff line parallel to the first cutoff line at a position spaced 2~8 mm to one side from the first cutoff line.

In this instance, the second cutoff line is provided at a position where the second cutoff line is spaced 2~8 mm from the first cutoff line toward the second base.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

FIGS. 3 to 5B each illustrates a bar code label sticker in accordance with a preferred embodiment of the present invention.

Figure 1:
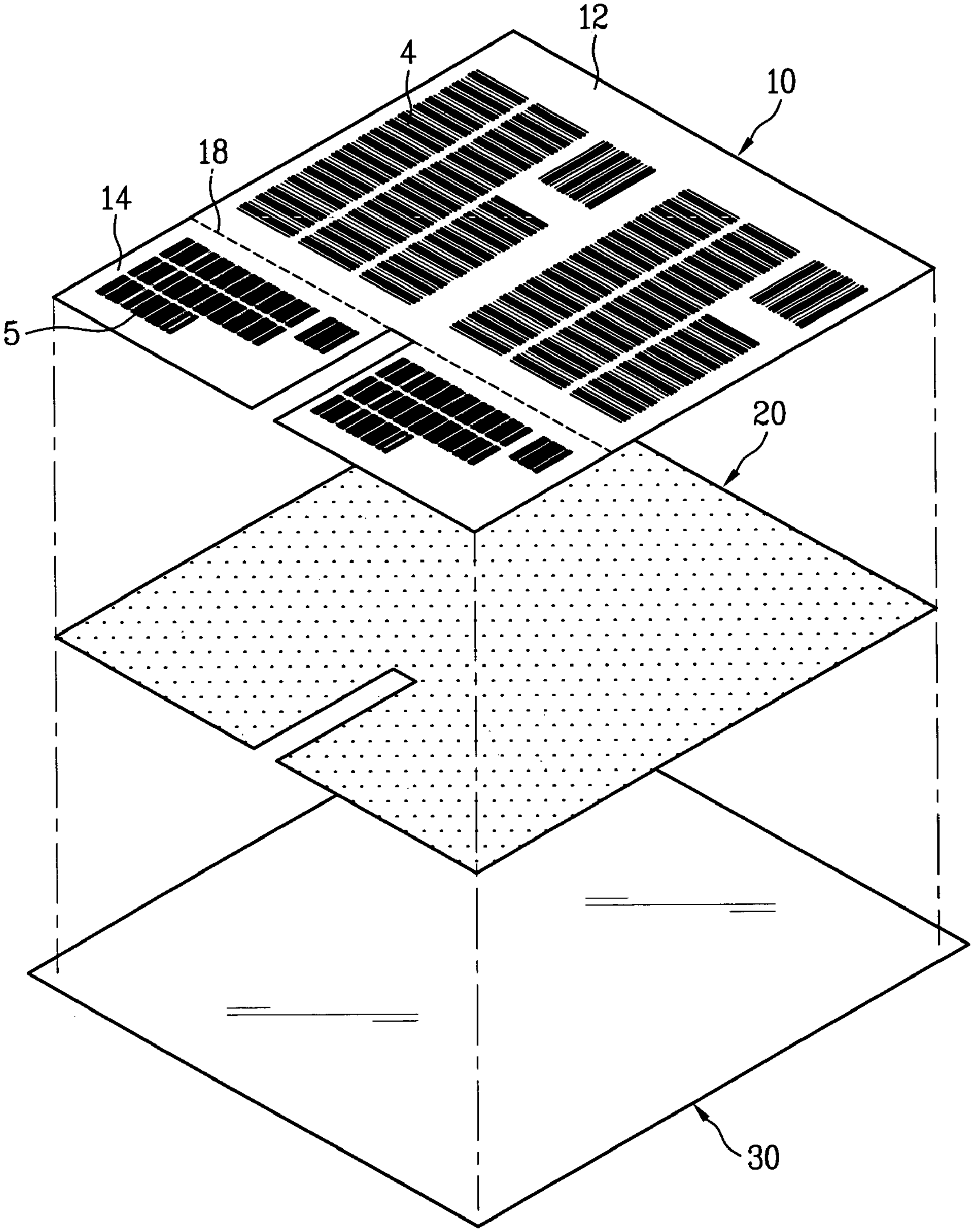
FIG. 1 illustrates an exploded perspective view of a related art bar code label sticker.
Figure 2:
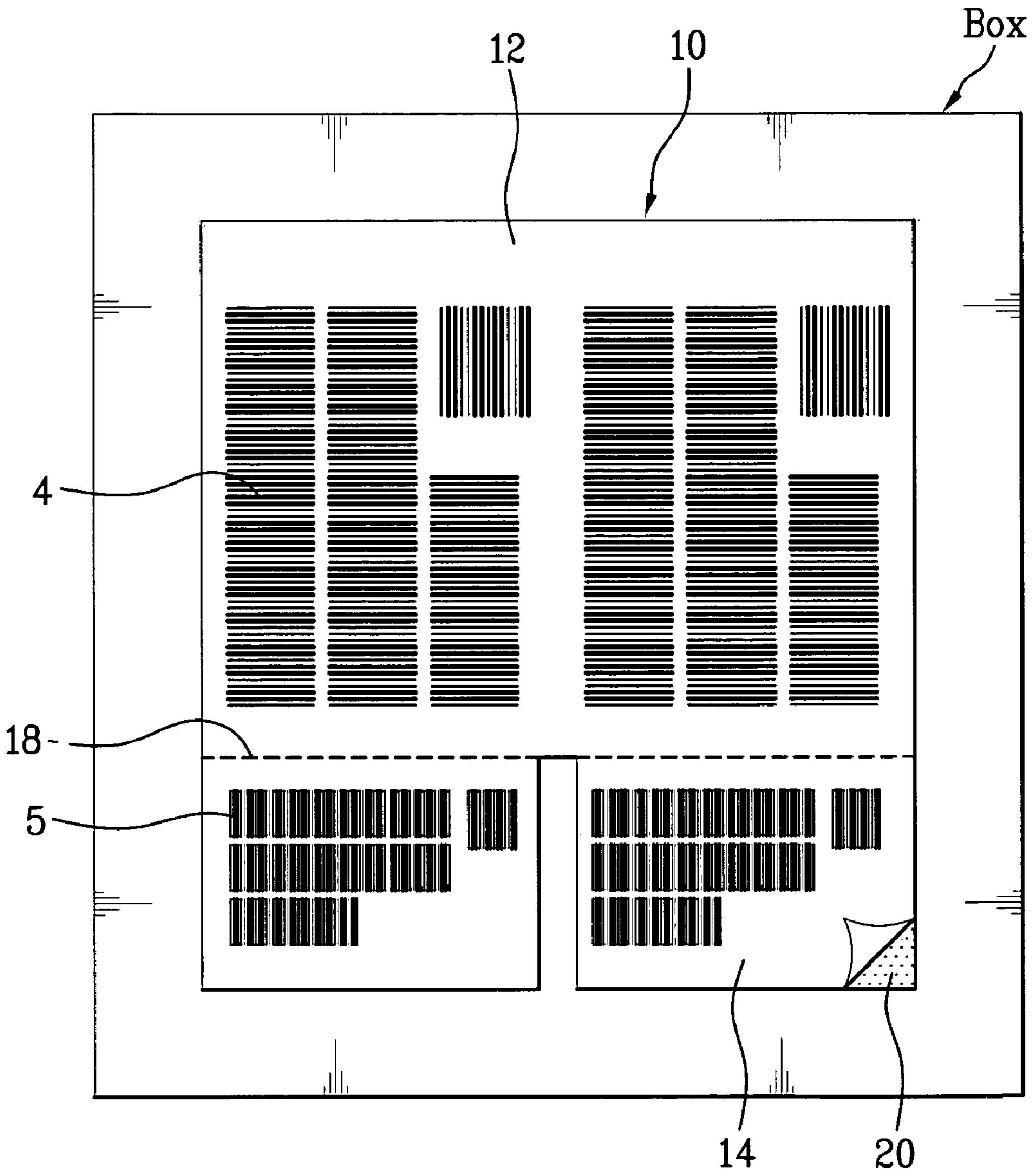
FIG. 2 illustrates a diagram of using the bar code label sticker in FIG. 1.
Figure 3:
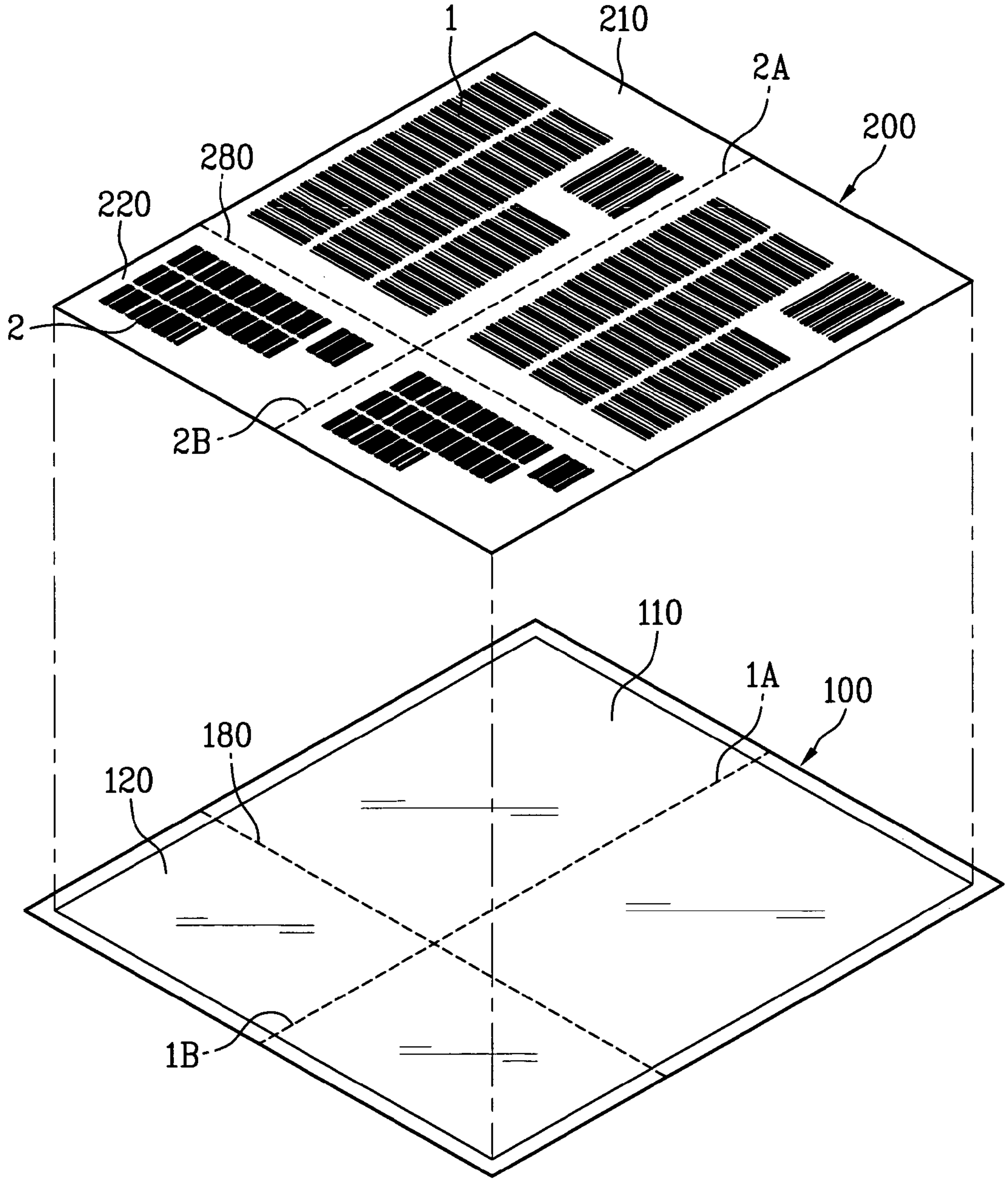
FIG. 3 illustrates an exploded perspective view of using the bar code label sticker in accordance with a preferred embodiment of the present invention.
Figure 4:
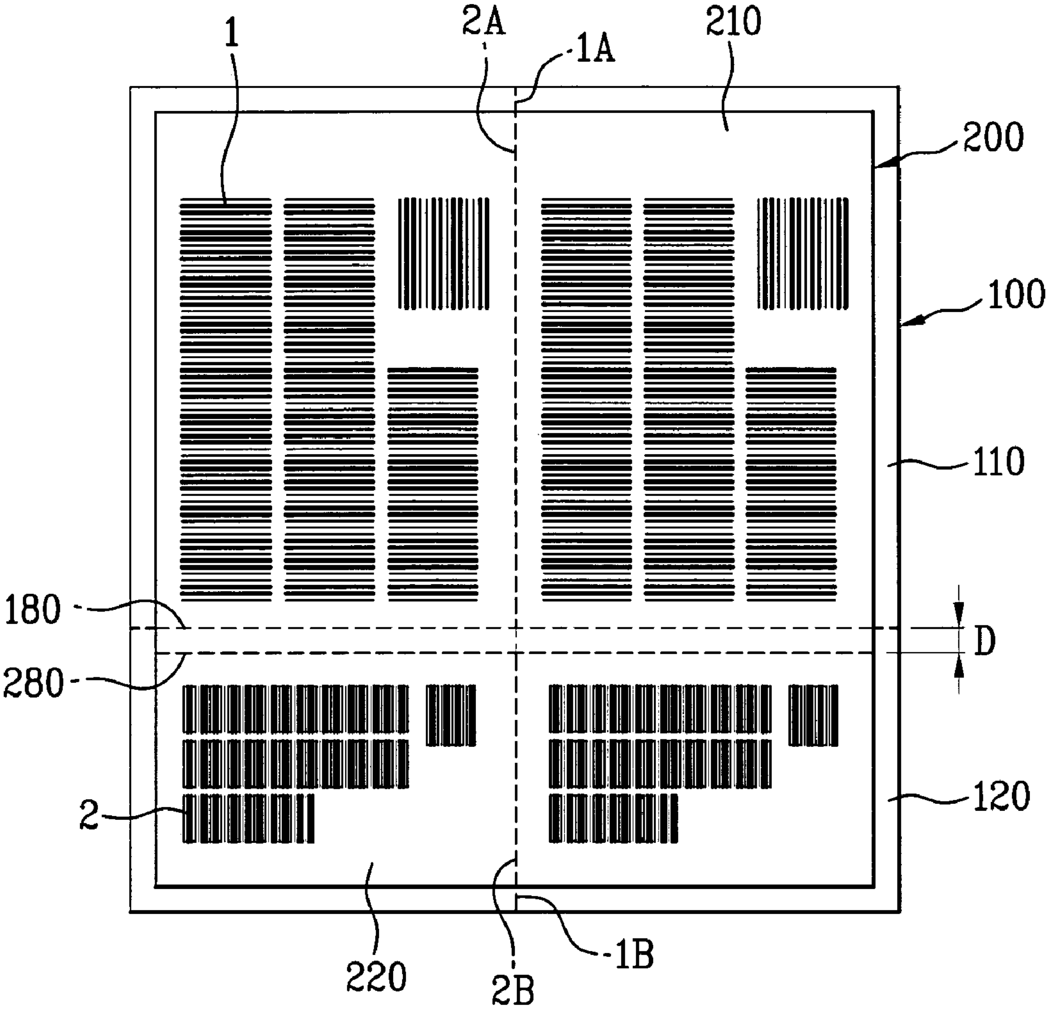
FIG. 4 illustrates a plan view of a bar code label sticker in accordance with a preferred embodiment of the present invention.

Referring to FIGS. 3 and 4, the bar code label sticker includes a base 100 having a first cutoff line 180 for separating the sticker in two parts.

The first cutoff line 180 crosses the base 100 in a left/right direction horizontally.

There is a sticker 200 attached to the base 100 having a second cutoff line 280 parallel to, and spaced a predetermined distance 'D' to one side from, the first cutoff line 180.

The base 100 has a length greater than a length of the sticker 200.

Moreover, the base 100 has a width greater than a width of the sticker 200.

In the meantime, the first cutoff line 180 is positioned such that the first cutoff line 180 divides the base 100 into a first base 110 on one side thereof, and a second base 120 on the other side thereof having an area smaller than the first base 110.

Moreover, the second cutoff line 280 is also positioned such that the second cutoff line 280 divides the sticker 200 into a first sticker 210 on one side, and a second sticker 220 on the other side having an area smaller than the first sticker 210.

The first sticker 210 is for attachment to a package box, and the second sticker 220 is for attachment to a pocket notebook or the like, separately for management.

The first base 110 has a cutoff line 1A crossing a middle thereof in a length direction so that the first base 110 becomes symmetry in a left/right direction with respect to the cutoff line 1A.

Moreover, the second base 120 also has a cutoff line crossing a middle thereof in a length direction so that the second base 120 becomes symmetry in a left/right direction with respect to the cutoff line 1B.

Alikely, the first sticker 210 also has a 2A cutoff line 2A crossing a middle thereof in a length direction so that the first sticker 210 becomes symmetry in a left/right direction with respect to the 2A cutoff line 2A, and the second sticker 220 also has a 2B cutoff line 2B crossing a middle thereof in a length direction so that the second sticker 220 becomes symmetry in a left/right direction with respect to the 2B cutoff line 2B.

The first sticker 210 and the second sticker 220 respectively have bar code labels 1, and 2 having information on kind and number of goods.

In this instance, as shown, the first sticker 210 has two first bar code label stickers 1 in symmetry in a left/right direction, and the second sticker 220 also has two second bar code label stickers 2 in symmetry in the left/right direction.

In the meantime, referring to FIG. 4, it is preferable that the second cutoff line 280 is formed 2~8 mm spaced away toward the second base 120 from the first cutoff line 180.

Figure 5A:
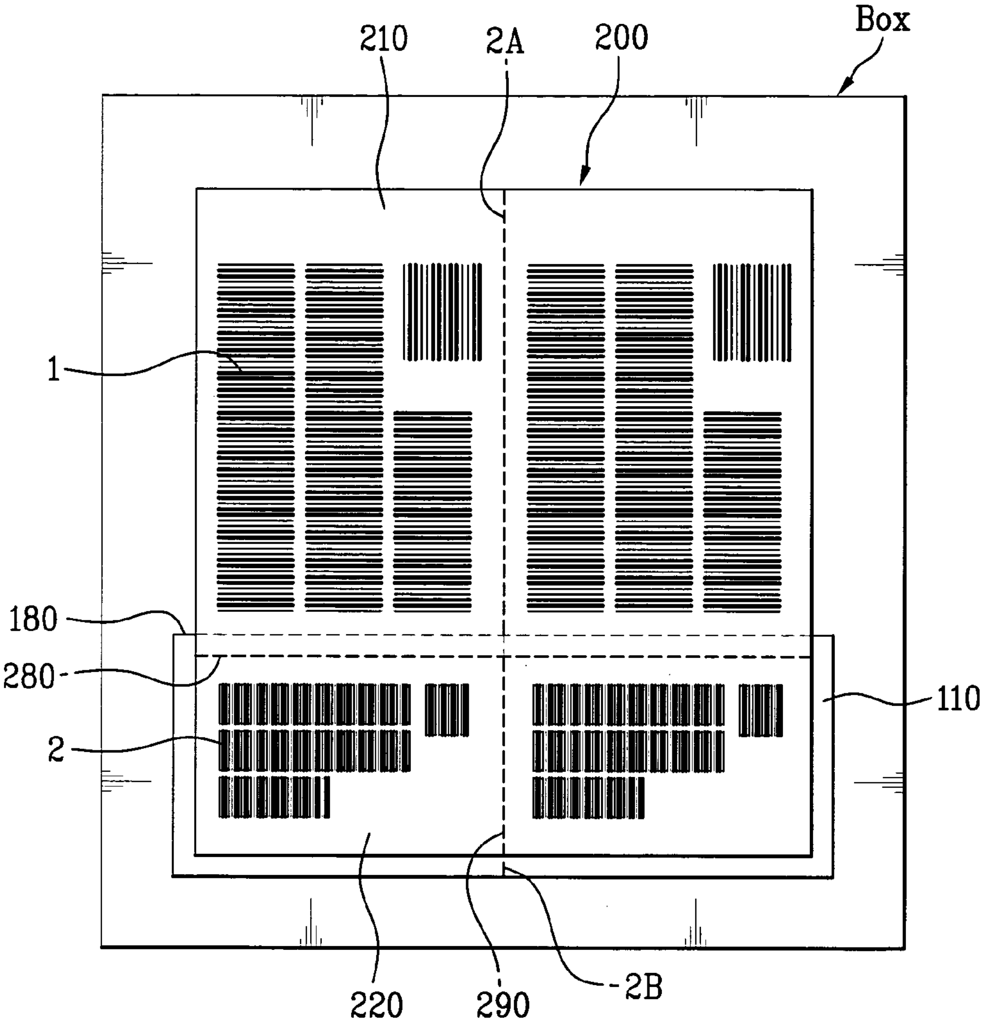
FIG. 5A illustrates a diagram of a bar code label sticker attached to a box in accordance with a preferred embodiment of the present invention.
Figure 5B:
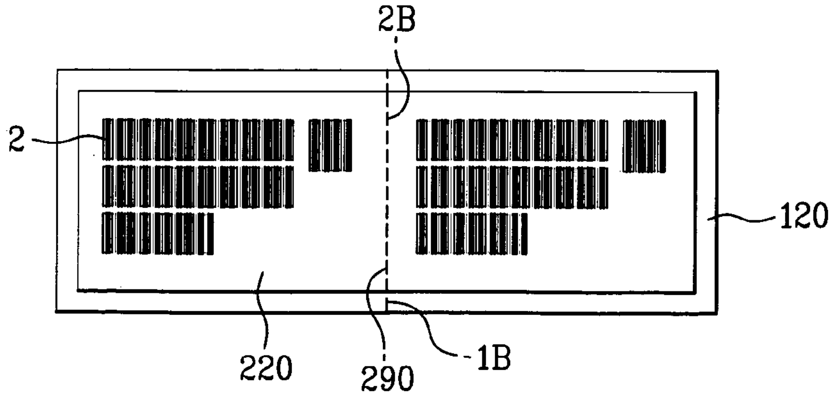
FIG. 5B illustrates a diagram of a detached supplementary sticker in accordance with a preferred embodiment of the present invention.

This is for easy separation of the first base 110 from the second base 120 by using the first cutoff line 180 after detachment of the first sticker 210 from the first base 110, and, at the same time with this, as shown in FIG. 5B, making a length, and a width of the second base 120 to be greater than a length, and a width of the second sticker 220, for convenience of use.

In the meantime, the first sticker 210 and the second sticker 220 have adhesive applied to surfaces opposite to surfaces having the bar code labels 1, and 2 provided thereon respectively, and, in correspondence to this, the first base 110 and the second base 120 are formed of vinyl or have the vinyl coated thereon for enabling repetitive attachment/detachment of the first, and second stickers 210, and 220 thereto/therefrom, respectively.

A method for using the bar code label sticker of the present invention will be described.

At first, after detaching the first base 120 from the sticker 200 in a state as shown in FIG. 4, the first sticker 210 is attached to an outside of a package box of goods as shown in FIG. 5A.

Then, the first base 110 is separated from the second base 120.

In this case, as shown in FIG. 5A, the second sticker 220 is in a state unattached to the package box owing to the second base 120.

Then, if the second sticker 220 is separated from the first sticker 210 along the second cutoff line 280 in a state as shown in FIG. 5A, the second sticker 220 attached to the second base 120 can be obtained as shown in FIG. 5B.

Or, after detaching the first sticker 210 from the first base 110 , and separating the first base 110 from the second base 120 along the first cutoff line 180, the first sticker 210 may be attached to the outside of the package box of goods.

Or, though not shown, as another embodiment of the present invention, the bar code label sticker of the present invention may not have the 1A cutoff line 1A or the 2A cutoff line 2A which separates the first sticker 210 or the first base 110 into two parts, respectively.

Effects of the bar code label sticker of the present invention will be described.

As described, even after the first sticker 210 is separated from the second sticker 220, the second sticker 220 is in a state the second sticker 220 is attached to the second base 120, enabling to prevent the second sticker 220 from attaching to other thing, thereby permitting easy keeping of the second sticker 220.

Moreover, after keeping the second sticker 220 with the second base 120 attached thereto separately, only the sticker 220 may be attached to the pocket notebook or the like after detaching the second sticker 220 from the second base 120.

Thus, the easy management of the second sticker permits more convenient use than the related art bar code label sticker, substantially.

Moreover, as the middle base can be dispensed with, the present invention is favorable in view of an environment and a production cost.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A bar code label sticker comprising:

a base having a first cutoff line for separating the base into two parts; and a sticker attached on the base, the sticker having a second cutoff line parallel to the first cutoff line at a position spaced a predetermined distance to one side from the first cutoff line for separating the sticker into a first sticker on one side thereof and a second sticker on the other side thereof, wherein each of the first sticker and the second sticker includes a bar code label having information on goods, and wherein the first cutoff line is arranged to cross the first sticker.

2. The bar code label sticker as claimed in claim 1, wherein the base has a length greater than a length of the sticker.

3. The bar code label sticker as claimed in claim 1, wherein the base has a width greater than a width of the sticker.

4. The bar code label sticker as claimed in claim 1, wherein the first cutoff line is positioned such that the first cutoff line divides the base into a first base on one side thereof, and a second base on the other side thereof having an area smaller than the first base.

5. The bar code label sticker as claimed in claim 4, wherein the first base includes an 1A cutoff line crossing a middle thereof in a length direction so that the first base becomes symmetry in a left/right direction with respect to the 1A cutoff line.

6. The bar code label sticker as claimed in claim 4, wherein the second base includes an 1B cutoff line crossing a middle thereof in a length direction so that the second base becomes symmetry in a left/right direction with respect to the 1B cutoff line.

7. The bar code label sticker as claimed in claim 1, wherein the second cutoff line is positioned such that the second cutoff line divides the sticker into a first sticker on one side thereof, and a second sticker on the other side thereof having an area smaller than the first sticker.

8. The bar code label sticker as claimed in claim 7, wherein the first sticker includes a 2A cutoff line crossing a middle thereof in a length direction so that the first sticker becomes symmetry in a left/right direction with respect to the 2A cutoff line.

9. The bar code label sticker as claimed in claim 7, wherein the second sticker includes a 2B cutoff line crossing a middle thereof in a length direction so that the second sticker becomes symmetry in a left/right direction with respect to the 2B cutoff line.

10. The bar code label sticker as claimed in claim 1, wherein the first sticker includes two bar code labels in symmetry in a left/right direction.

11. The bar code label sticker as claimed in claim 1, wherein the second sticker includes two bar code labels in symmetry in a left/right direction.

12. The bar code label sticker as claimed in claim 1, wherein the second cutoff line is provided at a position where the second cutoff line is spaced 2~8 mm from the first cutoff line toward the second base.

13. A bar code label sticker comprising:

a base having a first cutoff line for separating the base into a first base on one side thereof and a second base on the other side thereof; and a sticker attached on the base, the sticker having a second cutoff line parallel to the first cutoff line at a position spaced a predetermined distance to one side from the first cutoff line for separating the sticker into a first sticker on one side thereof and a second sticker on the other side thereof, wherein the first cutoff line is arranged to cross the first sticker.

* * * * *